United States Patent

[11] 3,621,429

| | | | | | | |
|---|---|---|---|---|---|---|
| [72] | Inventor | Frank W. Benke<br>Sharon, Pa. | 2,892,168 | 6/1959 | Seidel et al. | 336/90 X |
| [21] | Appl. No. | 88,289 | 3,129,282 | 4/1964 | Flynn | 174/177 |
| [22] | Filed | Nov. 10, 1970 | 3,159,709 | 12/1964 | Austin et al. | 174/140.1 |
| [45] | Patented | Nov. 16, 1971 | 3,367,686 | 2/1968 | Kurz | 174/177 |
| [73] | Assignee | Westinghouse Electric Corporation<br>Pittsburgh, Pa. | 3,549,790 | 12/1970 | Reed | 287/124 X |

Primary Examiner—Thomas J. Kozma
Attorneys—A. T. Stratton and F. E. Browder

[54] AIR CORE REACTOR
7 Claims, 6 Drawing Figs.

[52] U.S. Cl. .................................................... 336/197,
174/177, 287/124, 336/207
[51] Int. Cl. ...................................................... H01f 27/30
[50] Field of Search .......................................... 336/197,
207, 90; 287/124, 114; 174/176, 177, 140.1, 138
D

[56] References Cited
UNITED STATES PATENTS
2,874,937   2/1959   Higgins.......................... 174/176

ABSTRACT: An air core reactor comprising a bottom member having a plurality of slotted cleats stacked thereon. Turns of conductors positioned in the slots in the cleats. A top member on top of the stacked cleats. Resin-impregnated fiber glass tie rods connected between the bottom member and the top member for holding the reactor assembled. A nonmagnetic metallic fitting on each end of each tie rod. The nonmagnetic metallic fittings are permanently attached to each end of the tie rods by forcing a tapered insert member into each end of the tie rods.

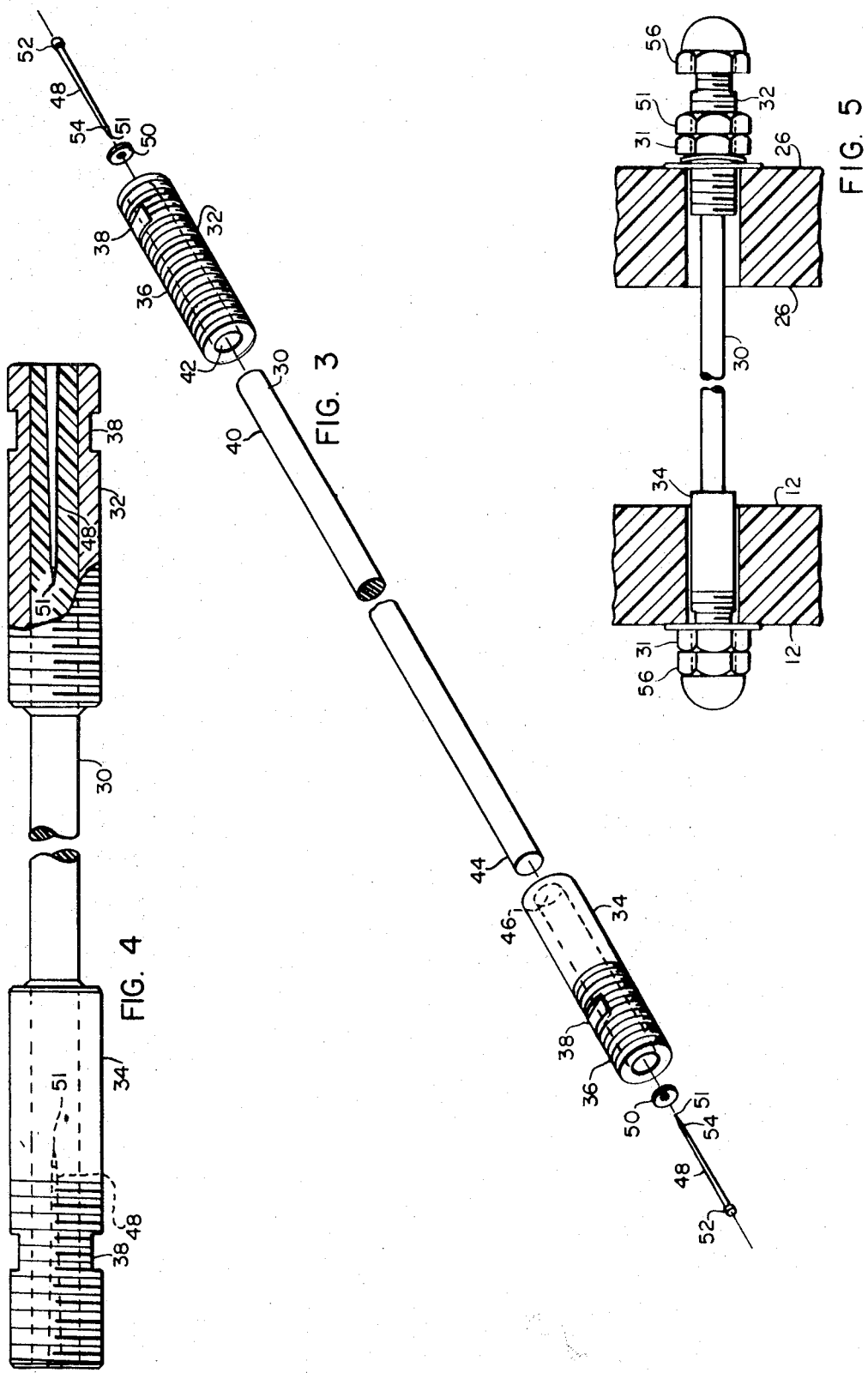

3,621,429

AIR CORE REACTOR

BACKGROUND OF THE INVENTION

1. Field of the Invention

This invention relates to air core, air-insulated, electrical reactors of the type utilized in introducing inductance into electrical power systems.

2. Description of the Prior Art

The prior art exemplifying reactors of the type claimed herein is illustrated by U.S. Pat. No. 2,892,168. This reactor utilizes glass fiber and resin tie rods. In the reactor of U.S. Pat. No. 2,892,168 the tie rods are provided by stringing glass fibers through aligned holes in the bottom plate, the columns of cleats, and the top plate. After the fiber glass fibers are strung through the holes, then resin is poured into the holes to bind the fibers together to provide a rigid tie rod. This method provides a satisfactory reactor, but it is expensive because of the time consumed in fabricating the tie rods in place after the reactor has been assembled.

The U.S. Pat. No. 2,858,056 illustrates a resin-bonded fiber glass tie rod having a tapered portion at each end with a clamp-type fitting on each tapered end of the rod. This type of device operates satisfactorily when first assembled, but after continuous use over long periods the clamping devices vibrate loose and the reactor becomes noisy.

Air core reactors of the type disclosed herein are connected to 60-cycle alternating current power systems and vibrate in a direction parallel to the tie rods at a frequency of 120 cycles per second. This continuous high-frequency vibration of the tie rods causes the clamping devices of U.S. Pat. No. 2,859,056 to vibrate loose and become noisy.

It has also been attempted in the prior art to directly thread resin-bonded fiber glass tie rods. In this type of rod the fibers are longitudinal to the rod and when threads are cut into the fibers these fibers are destroyed as far as providing tensile strength to the rod. It has also been found that with directly threaded fiber glass rods the threads are prone to shear off under continuous vibrations and the nuts on the rods will loosen and the assembly will become noisy. This type of threaded rod has not been satisfactory for use as tie rods for reactors of the type disclosed in this application.

The invention of the present application overcomes the objection to the prior art devices by providing a tie rod from resin-bonded fiber glass standard rod stock, and providing the standard rod stock with threaded metallic end fittings which will not become loose and noisy after continued use and vibration.

SUMMARY OF THE INVENTION

This invention provides an improved air core, air-cooled, reactor for providing inductance for electrical power systems. The reactor comprises a base member having columns of slotted cleats stacked thereon, with conductors positioned in the slots in the cleats, and a top member. The reactor is held assembled by providing resin-bonded glass fiber tie rods which pass through holes in the bottom and top members. The resin-bonded tie rods are provided with threaded nonmagnetic metallic fittings on each end. The nonmagnetic metallic fittings are threaded for receiving nuts for applying pressure to the assembly positioned between the bottom and the top member.

In one embodiment the nonmagnetic metal fittings comprises a sleeve having an opening just large enough to receive the ends of the tie rods. In this embodiment the sides of the tie rods are paralleled, with no taper, and the inside wall of the fitting is parallel to the sides of the tie rod. The ends of each tie rod are inserted into a fitting and then a tapered metallic insert member, such as a tapered circular nail, is forced into each end of the tie rods. The forcing of this tapered member into the ends of the tie rods forces the material of the tie rods out tightly against the inside walls of the fittings and provides a tight permanent connection between the tie rods and the fittings. The tapered member is of such shape that the material of the tie rod is forced with uniformly, from the extreme end of the tie rod to the pointed tip of the tapered member, force-loading increasing against the inside walls of the fittings. The insert is forced into the ends of the tie rods with an explosive charge. This step in the assembly of the reactor takes place so rapidly that the material of the tie rod is caused to tightly adhere to the inside walls of the fittings and to the metal insert member. This assembly provides a permanent connection between the tie rods and the end fittings which does not loosen and become noisy under continuous vibration operation. The fittings are threaded for receiving nuts for applying force to the assembly mounted between the bottom member and the top member.

In another embodiment of the invention provided herein the ends of the resin-bonded fiber glass tie rods are provided with a nonmagnetic metallic spring member. The metallic fittings are each provided with a tapered threaded hole. The fittings are attached to the end of the tie rods by screwing the ends of the tie rods, which have the nonmagnetic spring thereon, tightly into the tapered threaded holes in each of the fittings.

BRIEF DESCRIPTION OF THE DRAWINGS

FIG. 3 is an exploded view of a tie rod and the fittings of the tie rod used in the reactor shown in FIGS. 1 and 2;

FIG. 4 is an assembled view of the tie rods and fittings shown in FIG. 3;

FIG. 5 is a schematic view illustrating the arrangement of a tie rod relative to the bottom member and the top member of the reactor; and, FIG. 6 is a sectional view illustrating a second method for attaching fittings to the ends of a resin-bonded fiber glass tie rod.

DESCRIPTION OF THE PREFERRED EMBODIMENTS

Figure 1:
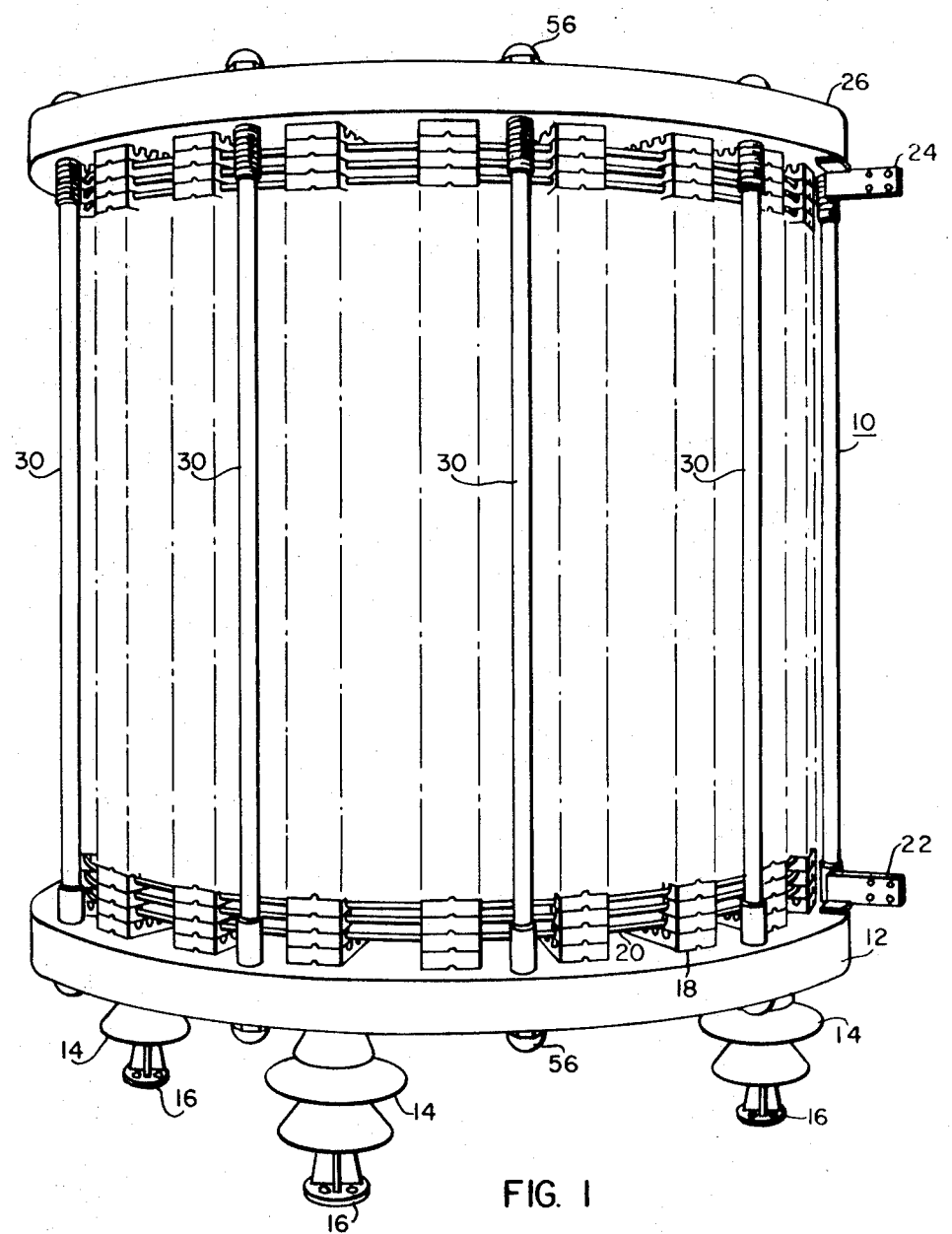
FIG. 1 is a perspective view of an air core, air-cooled reactor, as provided by this invention.

Throughout the description which follows like reference characters refer to like parts in all of the various figures of the drawings.

Figure 2:
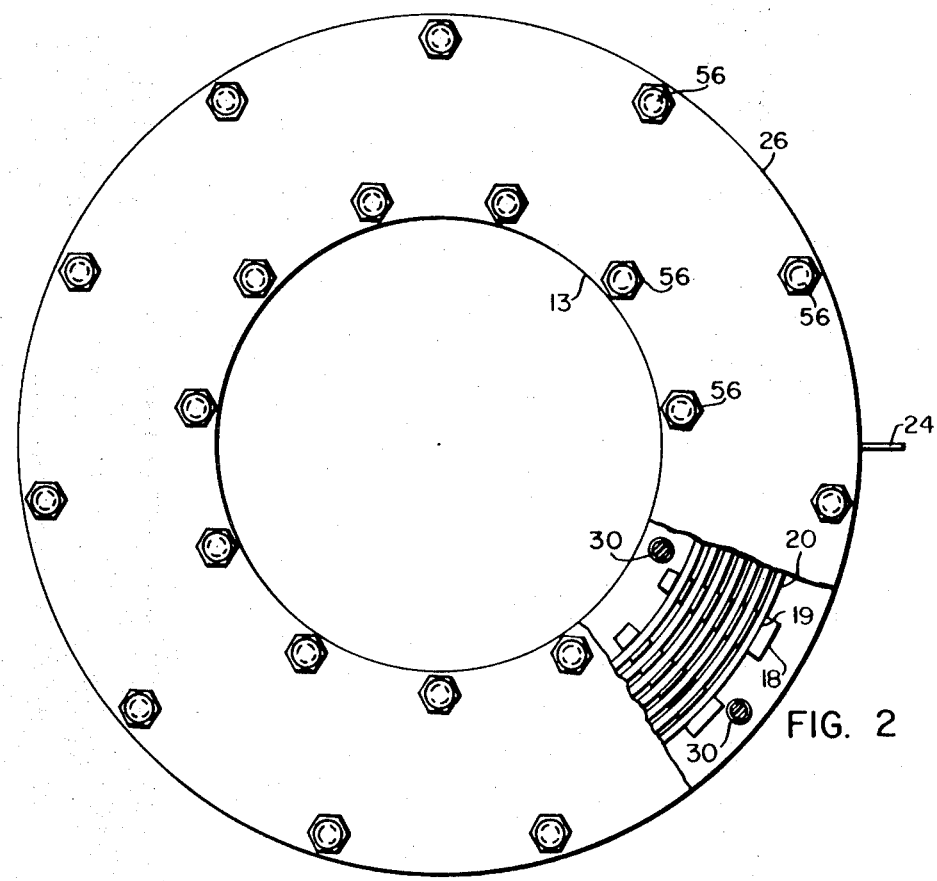
FIG. 2 is a top view of the reactor shown in FIG. 1, with parts broken away.

Referring to the drawings, and FIGS. 1 and 2 in particular, there is shown a single-phase, air core, air-insulated, reactor assembly 10 constructed according to the teachings of this invention.

The reactor 10 comprises a bottom member 12 which is supported by plurality of insulators 14 having mounting feet 16 for tying the reactor 10 down to the foundation. A plurality of slotted cleat members 18, having slots 19, are located on the base member 12 and a layer of turns of electrical conductor 20 is place in the slots 19 in the cleats 18. When a layer of conductor has been completed another layer of cleats 18 is positioned on top of the previous layer of cleats 18 and another layer of conductor 20 is placed in the slots 19 in the second layer of cleats 18. This process of laying up the reactor in layers, with layers of conductors 20 positioned in the slots 19 in the cleats 18 is continued until the necessary buildup is obtained to provide the desired inductance in the reactor. Terminal members 22 and 24 are provided for connecting the reactor to a power system.

After the desired number of layers of turns of conductivity 20 have been assembled in the slots 19 of the columns of stacked slotted cleats 20 a top member 26 is placed on top of the uppermost layer of cleats 18. Then the entire assembly is clamped between the bottom member 12 and the top member 26 by means of two circular rows of resin-bonded fiber glass tie rods 30. The tie rods 30 extend through holes in the bottom member 12 and holes in the top member 26. Pressure is applied to the assembly between the bottom member 12 and the top member 26 by tightening nuts 31 which engage threads 36 on nonmagnetic metallic fittings which are attached to the upper and lower ends of the tie rods 30 in a manner which will be described in detail hereinafter.

Referring specifically to FIG. 3, this figure shows an exploded view of a resin-bonded fiber glass tie rod 30 constructed of longitudinal fiber glass filaments bonded together with epoxy or polyester resin. The fiber glass filaments of the rod 30 are continuous from end to end in the rod 30. A top or upper end fitting 32 of nonmagnetic metallic material is provided for the top or upper end of the tie rod 30, and a bottom or lower end fitting 34 of nonmagnetic metallic material is provided for the bottom or lower end of the resin-bonded fiber glass tie rod 30. The fittings 32 and 34 are made from some suitable nonmagnetic metal, such as copper, brass or stainless steel. Both of the fittings 32 and 34 are provided with threads 36 for receiving nuts for applying pressure to the assembly. Each of the fittings 32 and 34 is provided with a flat surface 38 for applying a wrench to hold the tie rod 30 to prevent it from turning during the installation of the nuts on the threads 36.

The resin-bonded fiber glass tie rod 30 has straight parallel sides from end to end. The fittings 32 and 34 have holes therethrough from end to end which are just large enough to snugly receive the ends of the tie rod 30. The holes through the fittings 32 and 34 also have straight parallel sides. During the assembly of the tie rod 30 and the end fittings 32 and 34, the upper end 40 of the tie rod 30 is inserted into the opening 42 in the fitting 32 and the lower end 44 of the tie rod 30 is inserted into the opening 46 and in the lower fitting 34. After the upper end fitting 32 has been placed on the upper end 40 of the rod 30 and the lower fitting 34 has been placed on the lower end 44 of the tie rod 30, then the assembly is permanently fastened together by forcing a tapered metallic insert member 48 into the ends 40 and 44 of the tie rod 30 by means of an explosive charge. A washer 50 is utilized for centering the insert 48.

The metallic insert member 48 has a head portion which starts at 52 and a point or tip portion 51 which starts at 54. The insert member 48 has a longitudinal taper from the point 52 to the point 54 of approximately 0.75°. The insert member 48 is circular in cross section and is so shaped that when it is forced into the ends 40 and 44 of the resin-bonded fiber glass tie rod 30 that the material of the tie rod 30 is forced outward against the inside walls of the openings 42 and 46 in the end fittings 32 and 34 to load the inside walls of the end fittings 32 and 34 with force, which increases uniformly from the extreme end 52 to the point portion 54 of the insert member 48, throughout the entire length of the end fittings 32 and 34. The insert members 48 are forced into the ends of the tie rods with an explosive force that acts so rapidly that the material of the tie rod 30 is displaced so rapidly toward the inside sidewalls of the end members 32 and 34 that the material of the tie rod 30 tightly adheres to the inside walls of the end fittings 32 and 34.

After the fittings 32 and 34 have been attached to the ends 40 and 44 of the tie rod 30 by forcing the tapered metallic inserts 48 into the ends 30 and 44 of the tie rod 30 until the head portions 52 of the insert members 48 are tight against the washers 50, then the head portions 52 of the insert members 48 and the washers 50 are removed and the ends of the insert members 48 are finished flush with the ends of the tie rod 30. The two ends of the tie rod 30 are then flush with the extreme ends of the fittings 32 and 34.

The tie rods 30 are utilized in two circular patterns as indicated best in FIG. 2, one of the circles of rods being near the outside periphery of the top and bottom members 12 and 26 and another circle of rods 30 being near a central opening 13 in the top and bottom members 12 and 26.

After the reactor 10 has been assembled, the tie rods 30 are placed through holes in the bottom member 12 and the top member 26 and a nut 31, FIG. 5, is placed on the bottom fitting 34. Then a lockwasher 33 is placed on the top fitting 32 and a nut 31 is tightened down on the threads 36 of the top fitting with a torque of approximately 75 foot-pounds. Then another locknut 51 is tightened down onto the nut 31. This procedure is repeated until both the inside and outside circles of tie rods 30 have been installed, then capnuts 56, FIG. 5, are tightened down onto the top and bottom fittings 32 and 34.

It has been found in actual practice that fittings attached with the explosive installed insert member 48 as described herein provides a permanent attachment of the fittings 32 and 34 to the upper end 40 and the lower end 44 of the tie rod 30 which will not loosen under continuous operating conditions and vibrate to cause noise.

Figure 6:
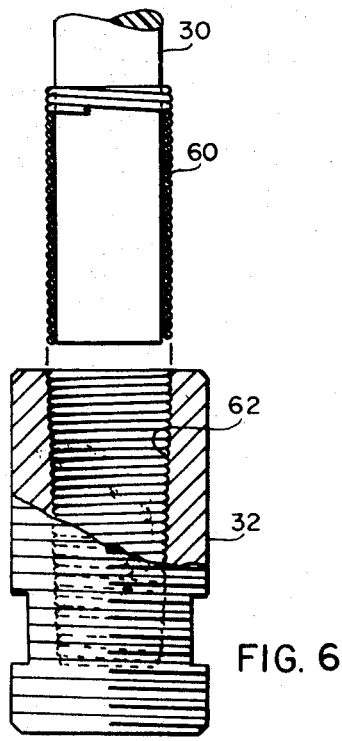

FIG. 6 illustrates a second embodiment of a satisfactory method for attaching fittings such as 32 or 34 to the two ends of the resin-bonded fiber glass tie rod 30. In this embodiment the tie rod 30 is provided with a nonmagnetic metallic spring 60 and the fittings, such as 32 and 34, are provided with a tapered threaded opening 62. The fitting 32 is screwed tightly onto the spring thread 60 and the thread 60 is pressed into the resin-bonded fiber glass tie rod 30 without cutting or severing the longitudinal fibers of the tie rod. In all other respects the tie rod provided according to FIG. 6 functions in the same manner as the tie rod of the previously described embodiment.

From the foregoing description taken in conjunction with the drawings it is seen that the present invention has provided an air core, air-cooled, reactor for providing inductance into electrical systems which is held in assembled relationship by means of resin-bonded fiber glass tie rods having continuous fiber glass strands the entire length of the tie rod; wherein, fittings are permanently attached to the ends of the tie rod in such manner that they will not become loose during continuous use and become noisy.

I claim as my invention:

1. An electrical reactor comprising a base member, a plurality of slotted cleats carried by said base member, windings disposed in said slots in said cleats, a top member, and a plurality of longitudinal tie rods having first and second ends connected between said base member and said top member to hold said reactor assembled, each of said tie rods comprising glass and resin material, said first and second ends of said tie rods being of substantially uniform cross section, first and second nonmagnetic metallic fittings for said first and second ends of said tie rods, said fittings being longitudinal and each having a uniform cross section opening therein throughout their length into which openings said first and second ends of said tie rods are inserted, metallic insert members having first and second ends, said metallic insert member having a longitudinal taper from said first end to said second end, one of said tapered metallic insert members being forced into each of said first and second ends of said tie rods to permanently fasten said first and second fittings to said first and second ends of said tie rods, each of said tapered metallic insert members as it is forced into said first and second ends of said tie rods displaces the material of said tie rods by forcing the material of said tie rods outwardly against the inside wall of the openings in said first and second fittings to distribute the force load on the inside walls of said first and second fittings throughout substantially the entire length of said first and said second fittings.

2. The apparatus of claim 1 wherein said tie rods comprise glass fibers bonded together with resin.

3. The apparatus of claim 1 wherein said first and second fittings are threaded to receive nuts.

4. The apparatus of claim 1 wherein said metallic insert member having first and second ends is nonmagnetic.

5. The apparatus of claim 1 wherein said metallic insert member having first and second ends has a substantially circular cross section.

6. The apparatus of claim 1 wherein said metallic insert member having first and second ends has a tip adjacent said second end and a longitudinal taper of approximately 0.75° from said first end to a point adjacent said second end wherein said tip begins.

7. The apparatus of claim 1 wherein a metallic insert member having a first and second end is driven into each said first and second end of said tie rods until said first end of each said metallic insert member is substantially flush with the respective end of said tie rods.